March 13, 1951 L. M. TINT 2,544,738
FORCE MEASURING DEVICE
Filed Aug. 2, 1945

Inventor
LESTER M. TINT
By Ralph L. Chappell
Attorney

Patented Mar. 13, 1951

2,544,738

UNITED STATES PATENT OFFICE 2,544,738

FORCE MEASURING DEVICE

Lester M. Tint, Palo Alto, Calif.

Application August 2, 1945, Serial No. 608,545

5 Claims. (Cl. 73—133)

(Granted under the act of March 3, 1883, as amended April 30, 1928; 370 O. G. 757)

This device relates generally to dynamometers, and more particularly to dynamometers of the strain gage type.

This device may find the following applications: (a) Recording time-history of stick or wheel forces and movements in testing airplanes in flight; (b) Recording magnitude and direction of forces in laboratory research or in any test work where such information is pertinent, and offering the following advantages: (i) Means of recording rapidly changing forces, even to forces reversing at high frequency; (ii) Usable where space is very restricted or at a premium; (iii) Usable where point of application of direction of force may shift rapidly or be uncontrollable; (iv) Recording of time-history remote from forces; (v) Recording perpendicular components of vector sum of all forces applied.

The principal object of this invention is to provide means for transmitting an electrical signal which can be calibrated on a recording oscillograph to record the magnitude and direction of the vector sum of forces applied anywhere on said invention.

For a more complete understanding of the invention and for other objects and advantages thereof, reference should now be had to the following descriptions in connection with the accompanying drawings, in which Fig. 1 is an elevational view of my invention showing it attached to the end of an airplane stick through means of an adapter;

Figure 1:
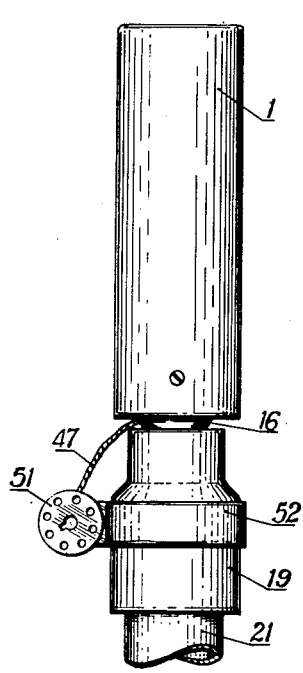
Figure 2:
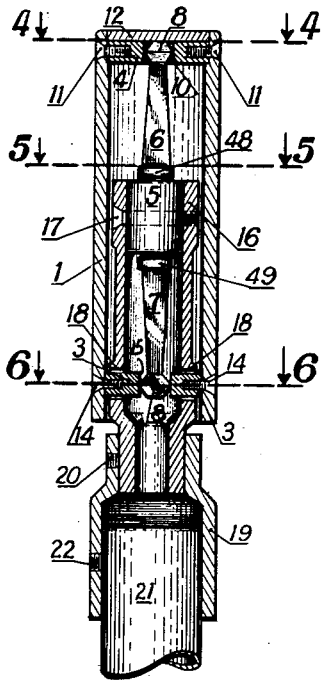
Fig. 2 is a half-sectional view of Fig. 1.
Figure 3:
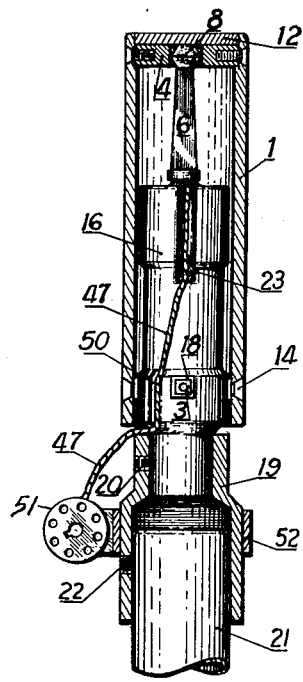
Fig. 3 is a sectional view of my invention showing the outer shell and adapter in half section and the inner structure in full elevation.
Figure 7:
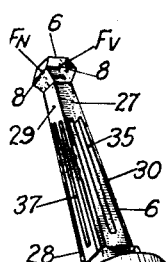
Fig. 7 is an isometric view of the strain member with the strain-sensitive elements attached thereto, and one end broken therefrom.

Numeral 1 indicates a cylindrical shell having a strainable member 2 coaxially positioned therein and fixed thereto by means of bed plates 4 at the top end and bed posts 3 at the bottom end of said cylindrical shell 1.

Strainable member 2 is an elongated unitary structure consisting of a cylindrical central portion 5, and two tapering portions 6 and 7 on each side thereof. Said tapering portions are square in cross-section. The ends of the tapered portions 6 and 7 are provided with integrally-cast transverse knife edges 8 that surround said ends. Said edges are stoned to approximately .005" radius, and function as the knife edges do in a weighing scale, i. e., to insure that the load will always be applied at a constant moment arm on the strain member 2.

Figure 4:
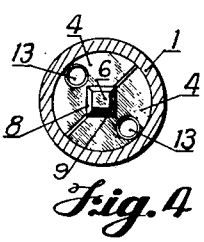
Fig. 4 is a cross-sectional view along line 4—4 of Fig. 2.
Figure 5:
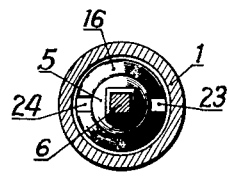
Fig. 5 is a cross-sectional view along line 5—5 of Fig. 2.
Figure 6:
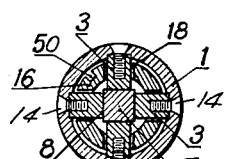
Fig. 6 is a cross-sectional view along line 6—6 of Fig. 2.
Figure 8:
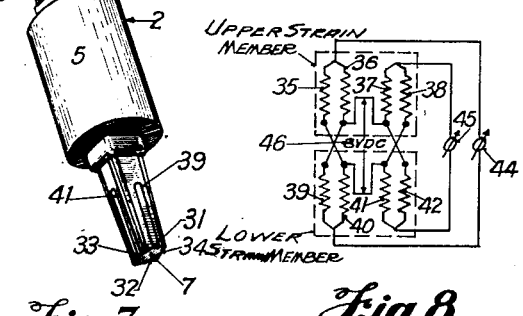
Fig. 8 is a wiring diagram embodying the strain-sensitive wires in bridge circuits.
Figure 9:
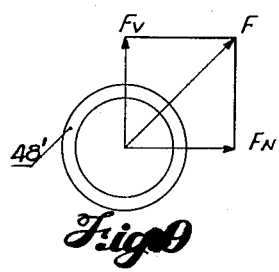
Fig. 9 is a vector diagram of the actuating forces shown on a plane at right angles to the longitudinal axis of the airplane stick.
Figure 10:
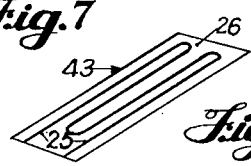
Fig. 10 is a plan view of a strain gage assembly of Fig. 1.

Bed plates 4 are companion semi-disc sections, each triangularly notched as at 9 in Figure 4 so as to receive the square ended, knife-edged portions 6 and 7 when said semi-circular sections 4 are in diametral association. Said bed plates 4 are of sufficient thickness to provide adequate bearing surfaces 10 for said knife edges 8. Said companion bed plates 4 snugly fit into said shell 1 and are secured thereto by means of screws 11. Circular head plate 12 is secured to the bed plates 4 by means of screws 13, and is in abutting engagement with the end of tapered portion 6.

Bed posts 3, quadrature spaced, are secured to the inner periphery of shell 1 at the bottom end thereof by means of screws 14. Said posts firmly engage the knife edges on tapered portion 7. They are of sufficient width to provide adequate bearing surfaces 15 for the knife edges.

Mounting frame or support 16 is a long tubular element which is coaxially positioned inside shell 1 so that one end fits over the cylindrical central portion 5 of strain member 2 while the other end projects beyond the open bottom end of said shell 1. Longitudinal slots 23 and 24, 180° related to each other, split that end of frame 16 that is associated with central portion 5. Said slots extend beyond the central portion 5 so that said slots also provide communication between the inside and outside of frame or support 16 through its slotted wall. The mounting frame or support 16 and strainable member 2 are clamped together by means of screw pin 17 in the conventional manner. Quadrature spaced holes 18 are provided in mounting frame 16 to receive bed posts 3 with sufficient clearance. The outward projecting end is adapted to be received by tubular adapter 19 and is fixed therein by set screw 20. Said adapter 19 also receives the airplane stick 21, or any other structure under test, and it is secured therein by means of set screw 22.

Strain-sensitive wires 25 are cemented on thin paper 26 with cellulose acetate cement, and one such strain gage assembly 43 is secured with the same cement to each of the four surfaces 27, 28, 29 and 30 of upper portion 6, and to each of the four surfaces 31, 32, 33 and 34 of lower portion 7 of strain member 2. In other words, strain gages 35, 36, 37, 38, 39, 40, 41 and 42 are mounted on surfaces 27, 28, 29, 30, 31, 32, 33 and 34, respectively. Said strain sensitive wires are mounted longitudinally with said strainable portions 6 and 7, with the free wire ends at the base thereof. Strain gages 35 and 40 in series, and strain gages 36 and 39 in series, are connected in parallel across the galvanometer elements of recording oscillograph 44, or calibrated millivoltage indicators. Strain gages 37 and 42 in series, and strain gages 38 and 41 in series, are connected in parallel across the galvanometer elements of recording oscilloscope 45. The common connections between gages 36 and 39, and between gages 37 and 42 are connected to one side of an 8 volt D. C. battery; the common connections between gages 35 and 40 and between gages 38 and 41 are connected to the other side of said battery 46.

The gage-connection lead 47 is bound to the strain gages at the base of strain members 6 and 7 by means of straps 48 and 49. Thence, the lead runs through slot 23, then along the outer periphery of support 16, thence through slot 50 cut in the enlarged portion of support 16 between two bed posts, and out to a standard octal socket 51, adapted to receive electrical connections from indicators 45 and 44, and connections from battery 46. Said socket is mounted on strap 52 carried by adapter 19.

*Operation*

Numeral 46' indicates the top view of my invention mounted on the end of the airplane stick 21. F is any resultant force applied to the airplane stick, through my invention, during the normal operation of the control surfaces of said airplane. $F_V$ and $F_N$ are the resolved components of said resultant force F, $F_V$ being a component of force F exerted in actuating the elevator surfaces, and $F_N$ being a component of force F exerted in actuating the aileron surfaces. Cooperative gages such as 35 and 40, or 38 and 41, etc., experience resistance changes and consequently cause bridge unbalance, when mounted on surfaces 27 and 32, or 30 and 33, etc., respectively, at least almost perpendicular to the applied force F as herein disclosed. The same applies where a mere component at least almost normal to said surfaces might exist. However, substantially all the force exerted by an aviator is applied normal to the stick. Therefore, when a system of forces is applied to shell 1, its resultant F is resolved into $F_V$ and $F_N$ by members 6 and 7 and the strain gages mounted thereon. These forces $F_V$ and $F_N$ produce strains in gages 35 and 40, or 38 and 41, etc., with the result that the resistance therein changes and the associated balancing circuit unbalances. The forces $F_V$ and $F_N$ produce strains $F_{V1}+F_{V2}$ from companion gages 35 and 40, $F_{N1}+F_{N2}$ from companion gages 38 and 41, respectively.

The gages are embodied in two independent Wheatstone bridges and recording circuits 35, 40, 36, 39, and 37, 42, 38, 41. The former reacts to $F_V$ and the latter to $F_N$. Said reactions cause unbalance in the bridge circuits accurately and independently proportional to the force components applied. Only a small resistance change in the strain-sensitive wires accompanies a large application of force. However, due to the electrical nature of the Wheatstone bridge, the electrical reactions $F_{V1}$ and $F_{V2}$ are additive, thereby producing a resultant reaction of $F_V$ equal to $F_{V1}+F_{V2}$. This resultant reaction $F_V$ is independent of the point of application of the force F on the shell 1. The same follows for $F_N$. $F_V$ is accordingly measured independent of $F_N$ and vice versa, because all gages are mounted symmetrically across the neutral axis of members 6 and 7, as 35 and 40, and 38 and 41, etc., and experience resistance changes only when the force applied has a component at least almost perpendicular to the surface on which the gage is mounted, consequently producing a signal proportional to its component alone.

The unbalances are recorded by the galvanometer elements 44 and 45 of the oscillographs, and the vector addition of the ordinates on the records at any time will give the magnitude and direction of the perpendicular component of the vector sum of all the forces applied.

The input voltage to the strain gages must be a constant D. C. to $\pm.2$ per cent to insure galvanometer deflections accurately proportional to the applied forces, because the galvanometer deflection is also proportional to the voltage input to the gage.

The gages are mounted on the members 6 and 7 so that the adjacent arms of the bridge which they form, such as 35 and 36, will lie on surfaces opposite to one another; and opposing arms of the bridge, such as 35 and 39, will lie on the same side of member 2. This is to obtain the maximum signal output from the gage bridge on the tension side of the members 6 and 7 and decreasing the resistance on the then two opposing arms of the bridge on the compression side of the members 6 and 7, both responding simultaneously.

The balance of the bridge is little affected by temperature, because of the proximity of all gage bridge arms to one another, and a covering of $\frac{1}{32}''$ felt thermal insulation around the gages, causes all the arms to take equally the temperature changes of the surrounding media, thus resulting in equal resistance changes. The above insulation also protects the gages from moisture effects.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. A dynamometer, comprising: a support adapted to be mounted on a member to be force analyzed; an elongated strainable member having end portions of rectangular cross-section, said member being supported intermediate its ends by said support, in a position normal to the forces to be measured; unitary means for transmitting said forces to the ends of said strainable member; and strain-sensitive wire gages mounted on each of the surfaces of said strainable member and connected to form two independent Wheatstone bridges so that adjacent gage arms of the bridges lie on surfaces opposite to one another and opposing gage arms of the bridges lie on surfaces on the same side of said strainable member, and said bridges including galvanometer elements of separate recording oscillographs for indicating bridge unbalance.

2. A dynamometer, comprising: a support adapted to be mounted on a member to be force analyzed; an elongated strainable member supported intermediate its ends by said support in a position normal to the forces to be measured; means for transmitting said forces to each end portion of said strainable member; and strain-sensitive wire gages quadrature spaced and mounted on said strainable member, connected and arranged to form two independent Wheatstone bridges so that adjacent gage arms of the bridges lie on opposite sides of said strainable member, and opposing gage arms of the bridges lie on the same side of said strainable member, and said bridges including separate calibrated millivolt indicators for measuring bridge unbalance.

3. A dynamometer, comprising: a support adapted to be mounted on an elongated member to be force analyzed; a strainable member supported between its ends by said support axially of said member; means for transmitting forces to said member through transverse pressure on the ends of said strainable member; and strain-sensitive wire gages forming a balanced circuit mounted on the intermediate portions of said strainable member, and adapted to be connected to indicating means.

4. A dynamometer comprising: a support adapted to be fixed rigidly without rotatable joint onto a member to be force analyzed; a solid, non-hollow, strainable member supported between its ends by said support; means for transmitting external forces to said strainable member in such a way that the sum of the forces applied to the ends of the strainable member will always be equal to the said external normal forces applied; and strain-sensitive wire gages affixed integrally to the surface of said strainable member; said wire gages interconnected into a balanced bridge circuit, this circuit being adapted to be connected to a source of electric current such that a voltage is created which varies with the strain in said strain-sensitive gages and said strainable member.

5. A dynamometer comprising: a support adapted to be mounted on an elongated member to be force analyzed; a strainable member supported between its ends by said support axially of said member; means for transmitting forces to said member through transverse pressure on the ends of said strainable member; strain-sensitive wire gages forming a balanced circuit mounted on the intermediate portions of said strainable member, and means operatively connected to said balanced circuit for measuring a voltage variable as the strain in said strain sensitive gages.

LESTER M. TINT.

REFERENCES CITED

The following references are of record in the file of this patent:

UNITED STATES PATENTS

| Number | Name | Date |
| --- | --- | --- |
| 1,906,551 | DeForest | May 2, 1933 |
| 2,283,707 | Sturtevant | May 19, 1942 |
| 2,322,319 | Ruge | June 22, 1943 |
| 2,329,541 | Kuehni | Sept. 14, 1943 |
| 2,338,732 | Nosker | Jan. 11, 1944 |

FOREIGN PATENTS

| Number | Country | Date |
| --- | --- | --- |
| 630,368 | Germany | May 28, 1936 |